June 10, 1958          E. N. CASTLE          2,837,837
MANUALLY OPERABLE GRAPHIC DEVICE FOR TEACHING DANCING
Filed Feb. 10, 1955
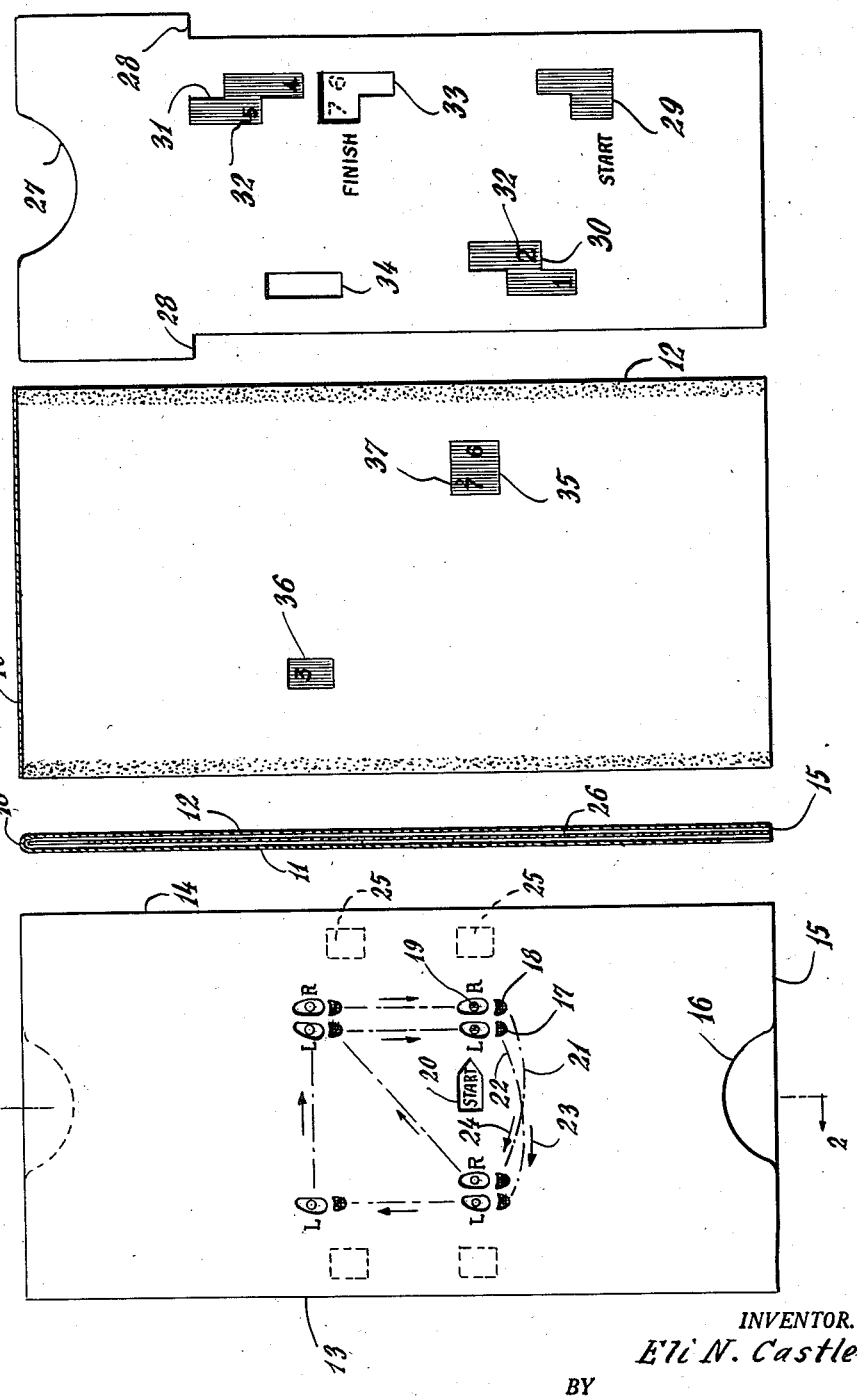
INVENTOR.
Eli N. Castle
BY United States Patent Office 2,837,837
Patented June 10, 1958

2,837,837
MANUALLY OPERABLE GRAPHIC DEVICE FOR TEACHING DANCING

Eli N. Castle, South Orange, N. J.

Application February 10, 1955, Serial No. 487,285

3 Claims. (Cl. 35—29)

This invention relates to education and more particularly to a device for facilitating the teaching of dancing and particularly the various styles of dancing involving relatively intricate steps.

Heretofore numerous devices have been developed for facilitating the teaching of dancing, but many of these merely involved charts showing the various positions of the feet and some involved rather complicated designs of floors in which transparent openings were provided with illuminating means to indicate the position of the feet in sequence during a particular dance step. Mere charts did not prove particularly satisfactory in view of the fact that the entire sequence of steps is visible at all times and tends to become confusing to the student attempting to learn the particular dance step and installations such as those requiring modification of the floor or building are relatively costly and difficult to install and are only useful in dance studios or the like having a well established and relatively large clientele.

It is accordingly an object of the invention to provide a relatively simple inexpensive device for facilitating the teaching of any particular dance step.

A further object of the invention is the provision of a device which may be conveniently and economically manufactured from paper, plastics or the like and which may be conveniently manually operated to indicate the proper sequence and position of the feet during a particular dance step.

A still further object of the invention is the provision of a device for facilitating the teaching of dancing in which the direction of movement and position of the feet during each phase of the step is indicated and in which the order of such movements are also indicated.

Another object of the invention is the provision of a device for facilitating the teaching of dancing in which the position of the feet during each phase of the step is the only indication visible at that particular time.

A further object of the invention is the provision of a device for facilitating the teaching of dancing, which device may be carried by the student and manipulated during execution of the dance step.

Further objects and advantages of the invention will be apparent from the following description taken in conjunction with the accompanying drawing wherein:

Fig. 1 is a top plan view of the device constructed in accordance with this invention;

Fig. 2, a sectional view taken substantially on the line 2—2 of Fig. 1;

Fig. 3, a view partially in section and showing the rear panel of the device; and Fig. 4, a top plan view of the slide disposed between the front and rear panels of the device as shown in Fig. 2.

With continued reference to the drawing, a device constructed in accordance with this invention may well comprise an elongated generally rectangular sheet of paper, plastic or other suitable material and folded at 10 to provide a front panel 11 and a rear panel 12. The panels 11 and 12 are secured together along their opposite side edges 13 and 14 to provide an envelope having an open end 15 and closed at the opposite end by the fold 10. The front and rear panels 11 and 12 are provided with semi-circular cut-outs 16 at the open end of the envelope, as shown in Fig. 1, for a purpose to be later described.

The front panel 11 is provided with left and right shoe outlines 17 and 18 and, as best shown in Fig. 1, such outlines are provided at the various positions occupied by the feet during different phases of the dance step to be taught. Obviously, the outlines 17 and 18 may be placed in any desired position on the front panel 11 in accordance with any desired dance step for which the device is to be utilized. It will be understood that a number of devices will be provided, each one being designed to teach a particular step. In the sole portion of each shoe outline there is provided an aperture 19 and there is also provided an elongated aperture 20 adjacent the shoe outlines disposed at the start and finish of the particular dance step. Lines 21 and 22 connect the shoe outlines in one position with the shoe outlines in other positions and arrows 23 and 24 are provided to indicate the correct movement of the feet during the change from one position to the next.

A plurality of tabs 25 are struck out from the front panel 11 and project inwardly between such panel and the rear panel 12 and serve to engage and slidably support a slide 26 disposed between the front and rear panels 11 and 12, as shown in Fig. 2. As best shown in Fig. 4, the slide 26 may well comprise an elongated generally rectangular sheet of suitable material, such as plastic, paper or the like, and this sheet is of substantially the same dimensions as the envelope provided by the front and rear panels 11 and 12. The slide 26 is provided at the end adjacent the fold tip end with a semi-circular cut-out 27, the purpose of this will be presently described. The major portion of the length of the slide 26 is of a reduced width to provide shoulders 28 which serve to engage certain of the tabs 25 and prevent movement of the slide 26 outwardly of the envelope beyond a certain point. Inward movement of the slide 26 is limited by the fold 10 at the closed end of the envelope.

For the particular dance step to be taught by the device illustrated a slide 26 is provided with colored areas 29, 30 and 31 of suitable configuration and the areas 30 and 31 are provided with numbers 32 which in the proper use of the device, indicate each phase of the dance step being taught. The slide 26 is likewise provided with two openings 33 and 34 of suitable configuration the purpose of which will be presently described. Also provided on the slide 26 is indicia in the form of the words "start" and "finish" and this indicia is visible through the elongated aperture 20 in the front panel 11 to indicate the position of the slide when the same is at the start and finish of the dance step.

The rear panel 12 is provided with colored areas 35 and 36 and these areas are provided with certain numbers 37 which together with the numbers 32 on the slide 26 operate to indicate the proper sequence of steps to be followed in the particular dance being taught.

In operation it is only necessary to grasp the front and rear panels 11 and 12 between the thumb and forefinger adjacent the fold 10 and the semi-circular cut-out in the slide 26 permits the front and rear panels to be so grasped and still not prevent free movement of the slide 26 between the panels 11 and 12. At the same time, the slide 26 will be grasped by the thumb and forefinger of the other hand at the semi-circular cut-out 16 in the front and rear panels 11 and 12 and, as shown in Fig. 1, the left and right foot of the dancer will be positioned as shown at the start of the dance step. The slide 26 is then moved outwardly of the envelope until the number 1 appears in one of the apertures in the shoe outline which indicates that the appropriate foot is to be moved to that location. Continued movement of the slide will bring the number 2 in registry with another aperture and indicate that the other foot is to be moved to that location. The colored areas are, of course, visible through the apertures at this time and tend to draw the dancers attention to the particular apertures to be observed. Continued movement of the slide will bring the slide in registry with the proper apertures 19 and at one position of the slide, the openings 33 and 34 in the slide 26 will register with the colored areas 35 and 36 and the numbers 37 on the rear panel 12 and cause such areas and numbers to be visible through the appropriate apertures 19. At the completion of the dance step the word "Finish" will appear in the elongated aperture 20 and the final numbers indicating the last two movements of the feet will appear in the apertures 19 adjacent the elongated aperture 20. The slide 26 may then be returned to the original starting position and the entire dance step repeated as many times as desired.

It will be obvious by the above described invention, there has been provided a relatively simple and economical device for facilitating the teaching of dancing and which device may be constructed of relatively inexpensive materials and by simple die-stamping operations which result in a device which may be sold at an extremely low price thereby providing a device which is entirely practical for the use of individual dancers in the home. Furthermore, the shoe outlines and apertures as well as the colored areas and numbers may be so positioned as to facilitate the teaching of any desired dance step and in view of the relatively low cost of the device, as many devices may be utilized as there are dance steps to be taught. The device may also, of course, be utilized as an advertising medium for dance studios.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A manually operable graphic device for teaching dancing comprising an elongated generally rectangular sheet folded upon itself at one end to provide an envelope open at one end and having front and rear super-imposed panels secured together along their opposite side edges, a semi-circular cut-out in said front and rear panels at the open end of said envelope, a plurality of right and left shoe outlines on said front panel denoting the several locations of the feet from start to finish of a particular dance step, an aperture in the sole portion of each shoe outline, an elongated cut-out adjacent the shoe outlines denoting the start and finish of the dance step, lines connecting certain of said shoe outlines and arrows indicating the direction of movement of the feet during each phase of the dance step, a slide comprising a generally rectangular elongated sheet disposed between said front and rear panels, tabs extending inwardly from said front panel adjacent the opposite side edges thereof and engaging said slide to support and guide the same for sliding movement in and out of the open end of said envelope, stop means on said slide for engaging certain of said tabs to limit outward movement of said slide, a semi-circular cut-out in the end of said slide adjacent the closed end of said envelope, colored areas on said slide disposed to register with said apertures in certain of said apertures in certain other positions of said slide, indicia on said slide disposed to register with said elongated cut-out at the inner and outer positions of said slide to indicate the start and finish of the dance step, colored areas on said rear panel disposed to register with said openings in certain positions of said slide and numbers on said last named areas whereby upon movement of said slide outwardly of said envelope said colored areas and numbers will become visible through said apertures in sequence to indicate the order of movement and proper positioning of the feet from start to finish of the dance step.

2. A manually operable graphic device for teaching dancing comprising an elongated generally rectangular sheet folded upon itself at one end to provide an envelope open at one end and having front and rear super-imposed panels secured together along their opposite side edges, a cut-out in said front and rear panels at the open end of said envelope, a plurality of right and left shoe outlines on said front panel denoting the several locations of the feet from start to finish of a particular dance step, an aperture in the sole portion of each shoe outline, an elongated cut-out adjacent the shoe outlines denoting the start and finish of the dance step, lines connecting certain of said shoe outlines and arrows indicating the direction of movement of the feet during each phase of the dance step, a slide comprising a generally rectangular elongated sheet disposed between said front and rear panels, tabs extending inwardly from said front panel adjacent the opposite side edges thereof and engaging said slide to support and guide the same for sliding movement in and out of the open end of said envelope, stop means to limit outward movement of said slide, a cut-out in the end of said slide adjacent the closed end of said envelope, colored areas on said slide disposed to register with said apertures in certain positions of said slide, numbers on certain of said areas, openings in said slide disposed to register with certain of said apertures in certain other positions of said slide, indicia on said slide disposed to register with said elongated cut-out at the inner and outer positions of said slide to indicate the start and finish of the dance step, colored areas on said rear panel disposed to register with said openings in certain positions of said slide and numbers on said last named areas whereby upon movement of said slide outwardly of said envelope said colored areas and numbers will become visible through said apertures in sequence to indicate the order of movement and proper positioning of the feet from start to finish of the dance step.

3. A manually operable graphic device for teaching dancing comprising an envelope open at one end and having front and rear super-imposed panels secured together along their opposite side edges, a plurality of right and left shoe outlines on said front panel denoting the several locations of the feet from start to finish of a particular dance step, an aperture in the sole portion of each shoe outline, an elongated cut-out adjacent the shoe outlines denoting the start and finish of the dance step, lines connecting certain of said shoe outlines and arrows indicating the direction of movement of the feet during each phase of the dance step, a slide comprising a generally rectangular sheet disposed between said front and rear panels, tabs extending inwardly from said front panel adjacent the opposite side edges thereof and engaging said slide to support and guide the same for sliding movement in and out of the open end of said envelope, stop means to limit outward movement of said slide, colored areas on said slide disposed to register with said apertures in certain positions of said slide, numbers on certain of said areas, openings in said slide disposed to register with certain of said apertures in certain other positions of said slide, indicia on said slide disposed to regster with said elongated cut-out at the inner and outer positions of said slide to indicate the start and finish of the dance step, colored areas on said rear panel disposed to register with said openings in certain positions of said slide and numbers on said last named areas whereby upon movement of said slide outwardly of said envelope said colored areas and numbers will become visible through said apertures in sequence to indicate the order of movement and proper positioning of the feet from start to finish of the dance step.

References Cited in the file of this patent

UNITED STATES PATENTS

| | | |
|---|---|---|
| 1,941,777 | Amos | Jan. 2, 1934 |
| 2,166,372 | Roeder | July 18, 1939 |
| 2,171,873 | Gould | Sept. 5, 1939 |
| 2,402,109 | Williams | June 11, 1946 |
| 2,605,557 | Van Deventer | Aug. 5, 1952 |
| 2,673,035 | McTeer | Mar. 23, 1954 |
| 2,676,421 | La Marr | Apr. 27, 1954 |

FOREIGN PATENTS

| | | |
|---|---|---|
| 169,371 | Switzerland | July 4, 1933 |